(12) United States Patent
Saito et al.

(10) Patent No.: US 8,099,964 B2
(45) Date of Patent: Jan. 24, 2012

(54) MAGNETIC REFRIGERATING DEVICE AND MAGNETIC REFRIGERATING METHOD

(75) Inventors: Akiko Saito, Kawasaki (JP); Tadahiko Kobayashi, Yokohama (JP); Hideyuki Tsuji, Yokohama (JP); Hideo Iwasaki, Kawasaki (JP); Katsumi Hisano, Matsudo (JP); Akihiro Koga, Tokyo (JP); Akihiro Kasahara, Chiba-ken (JP); Takuya Takahashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1155 days.

(21) Appl. No.: 11/860,818

(22) Filed: Sep. 25, 2007

(65) Prior Publication Data

US 2008/0078184 A1 Apr. 3, 2008

(30) Foreign Application Priority Data

Sep. 28, 2006 (JP) ................ P2006-265832

(51) Int. Cl.
*F25B 21/00* (2006.01)
*H01F 7/02* (2006.01)
(52) U.S. Cl. ......................... 62/3.1; 335/306
(58) Field of Classification Search ............ 62/3.4, 62/3.6; 335/306
See application file for complete search history.

(56) References Cited

U.S. PATENT DOCUMENTS

| | | | |
|---|---|---|---|
| 4,332,135 A | 6/1982 | Barclay et al. | |
| 4,829,770 A | 5/1989 | Hashimoto | |
| H693 H * | 10/1989 | Leupold | ............. 505/213 |
| 5,124,215 A | 6/1992 | Hashimoto | |
| 5,182,914 A * | 2/1993 | Barclay et al. | ............. 62/3.1 |
| 5,213,630 A | 5/1993 | Hashimoto | |
| 5,743,095 A * | 4/1998 | Gschneidner et al. | ............. 62/3.1 |
| 6,826,915 B2 | 12/2004 | Wada et al. | |
| 2007/0125094 A1 | 6/2007 | Iwasaki et al. | |

FOREIGN PATENT DOCUMENTS

| | | | |
|---|---|---|---|
| JP | 60-204852 | | 10/1985 |
| JP | 62-243377 | | 10/1987 |
| JP | 62243377 | * | 10/1987 |
| JP | 64-46545 | | 2/1989 |
| JP | 8-278066 | | 10/1996 |
| JP | 2003-28532 | | 1/2003 |
| JP | 2008-82663 | | 4/2008 |

* cited by examiner

OTHER PUBLICATIONS

C. Zimm, et al., "Description And Performance Of A Near-Room Temperature Magnetic Refrigerator", Advances in Cryogenic Engineering, vol. 43, 1998, pp. 1759-1766.

*Primary Examiner* — Judy Swann
*Assistant Examiner* — Ignacio E Landeros
(74) *Attorney, Agent, or Firm* — Oblon, Spivak, McClelland, Maier & Neustadt, L.L.P.

(57) ABSTRACT

A magnetic refrigerating device includes: a magnetic refrigerating unit including a magnetic material "A" exhibiting a magneto-caloric effect that the temperature of the material "A" is increased by the application of a magnetic field and the temperature of the material "A" is decreased by the removal of a magnetic field, a magnetic material "B" exhibiting a magneto-caloric effect that the temperature of the material "B" is decreased by the application of a magnetic field and the temperature of the material "B" is increased by the removal of a magnetic field, a heat conductive material "a" exhibiting higher heat conductivity under the application of a magnetic field and lower heat conductivity under the removal of a magnetic field, and a heat conductive material "b" exhibiting lower heat conductivity under the application of a magnetic field and higher heat conductivity under the removal of a magnetic field, wherein the magnetic refrigerating unit is configured so as to include at least one layered structure denoted by "AaBb" or "AbBa"; and a magnetic field-applying means to apply a magnetic field to the magnetic refrigerating unit.

20 Claims, 15 Drawing Sheets

FIG. 3
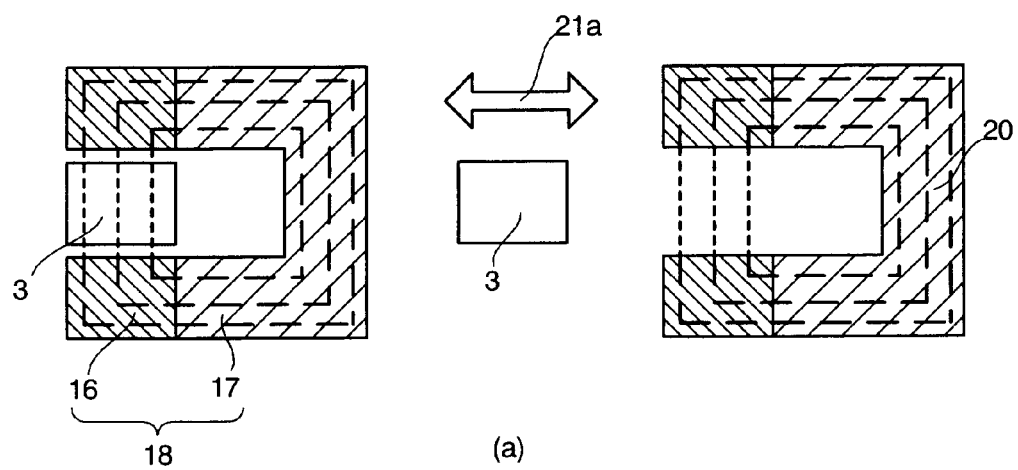
(a)
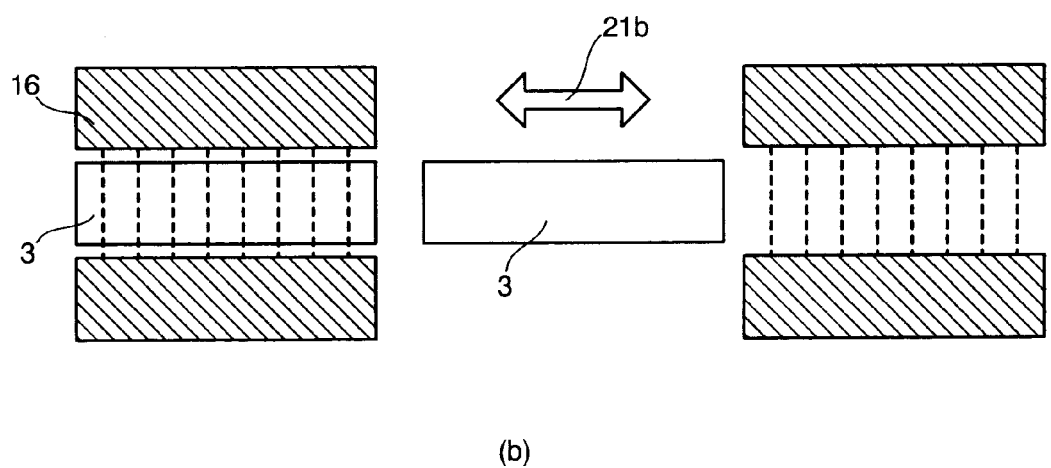
(b)

FIG. 4
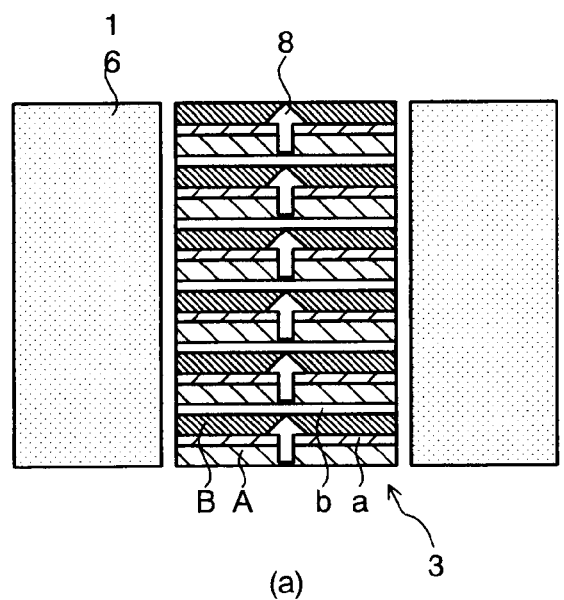
(a)
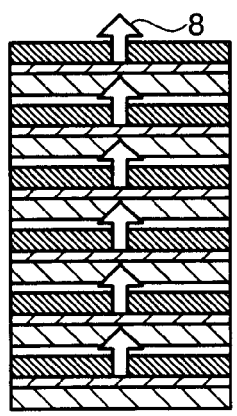
(b)

FIG. 7
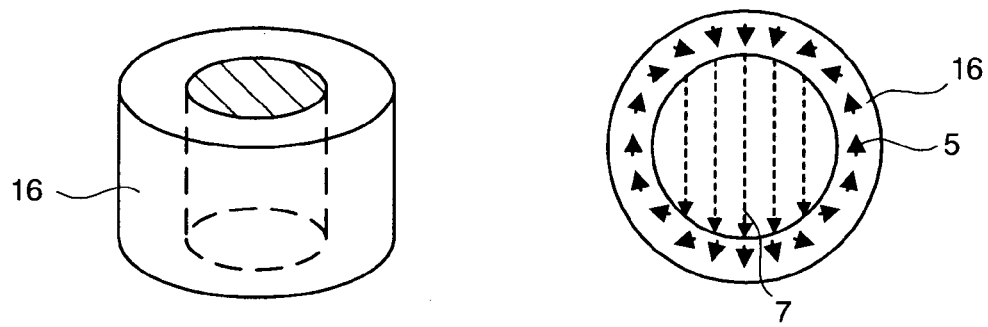
(a)
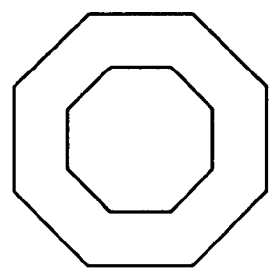
(b)

FIG. 8
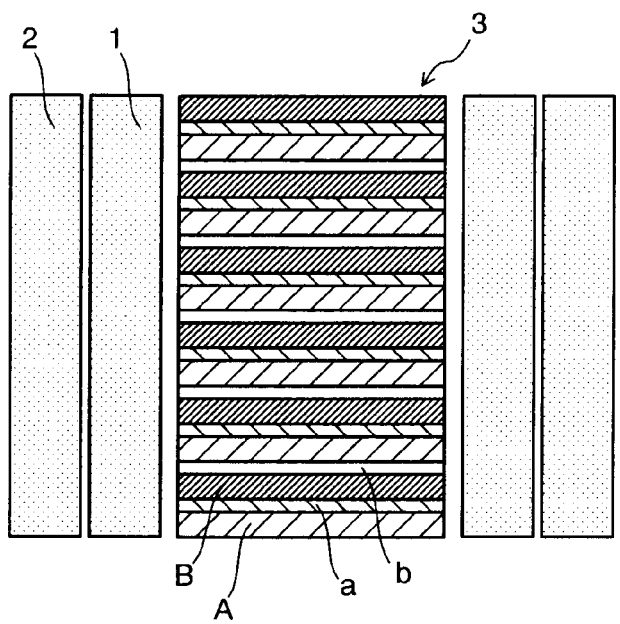
(a)
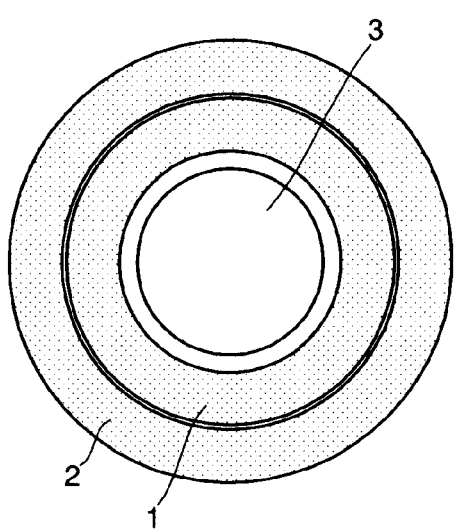
(b)

FIG. 9
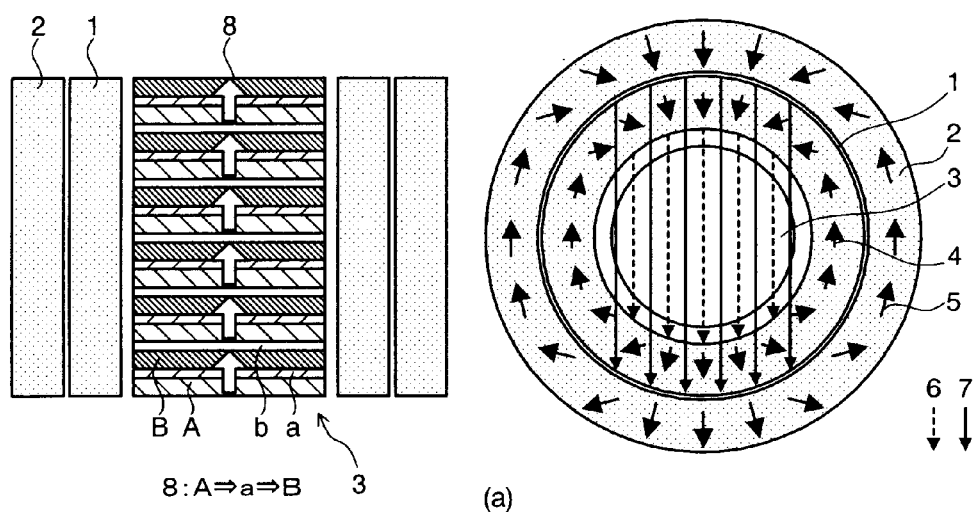
(a)
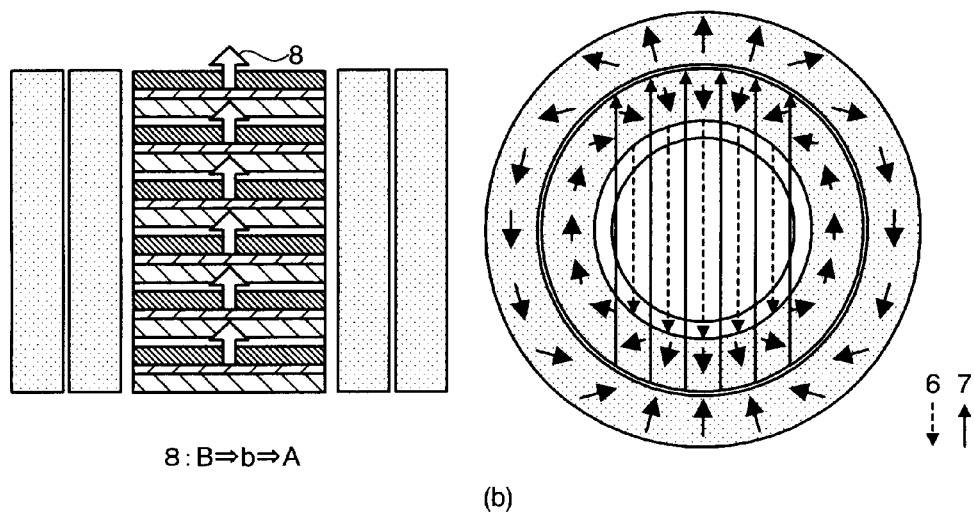
(b)

FIG. 10
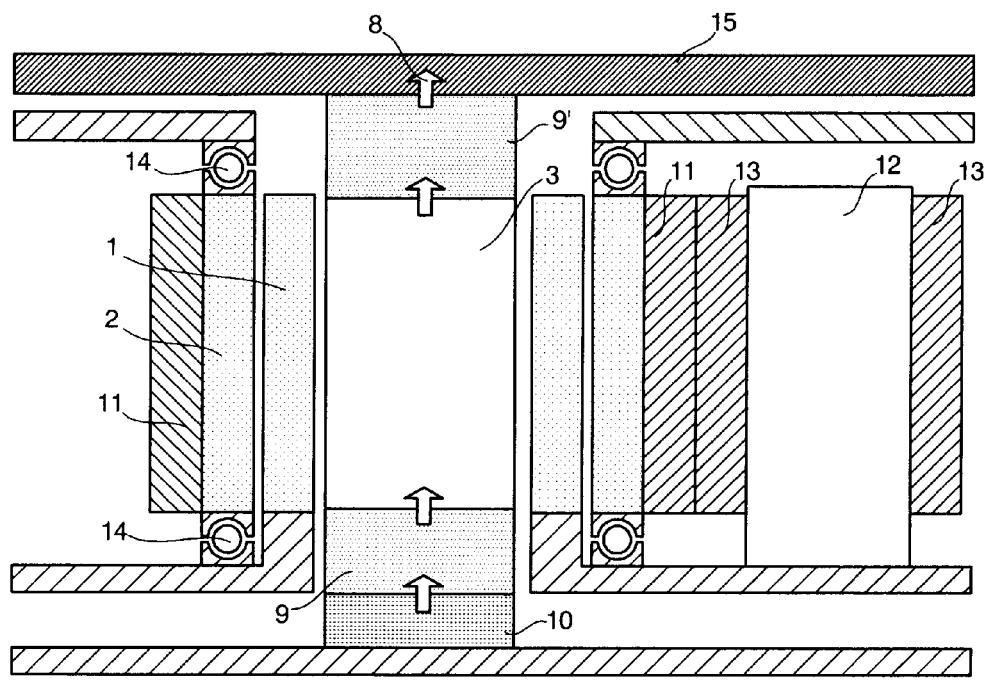
(a)
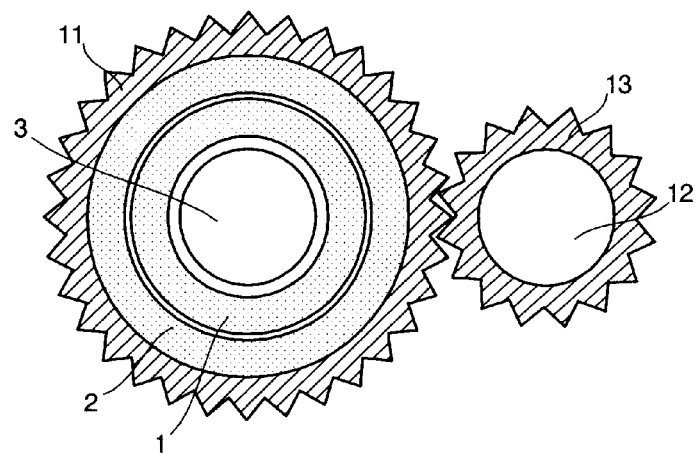
(b)

FIG. 11
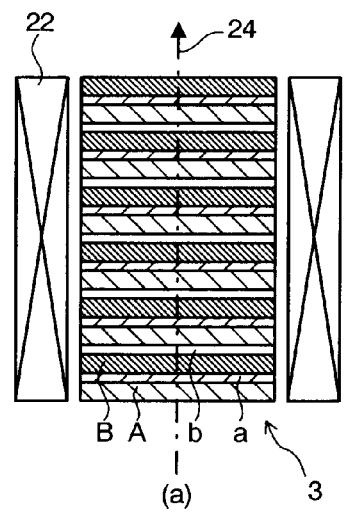
(a)
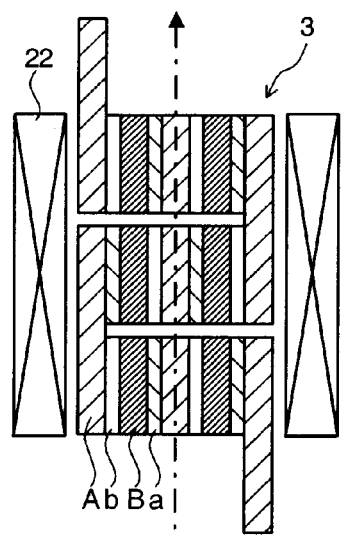
(b)
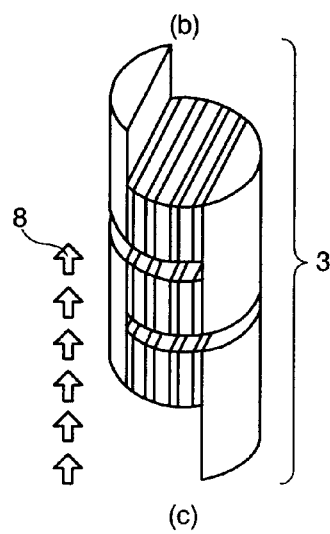
(c)

FIG. 12
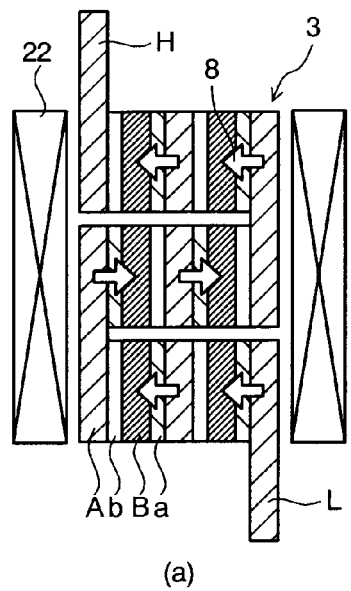
(a)
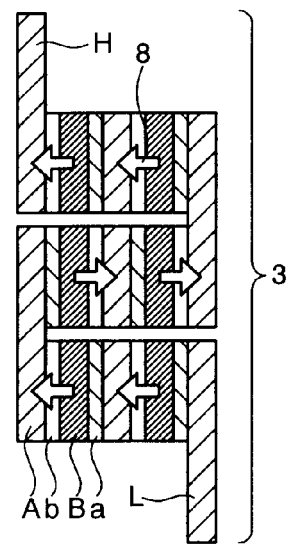
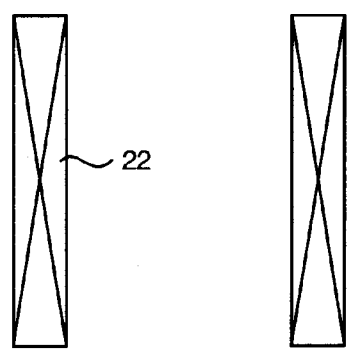
(b)

FIG. 13
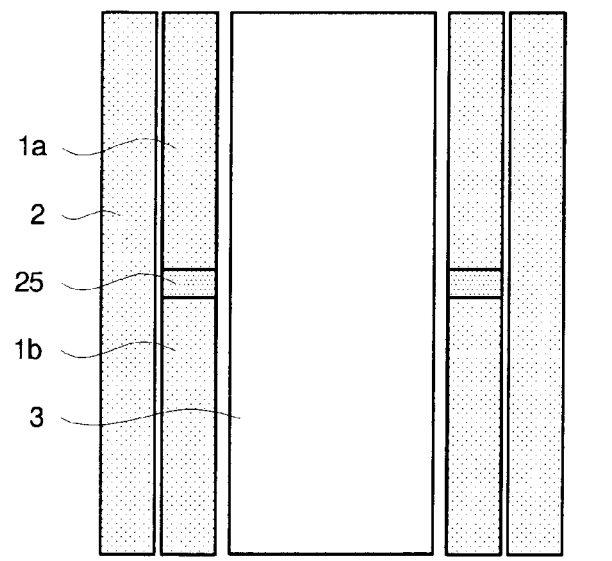
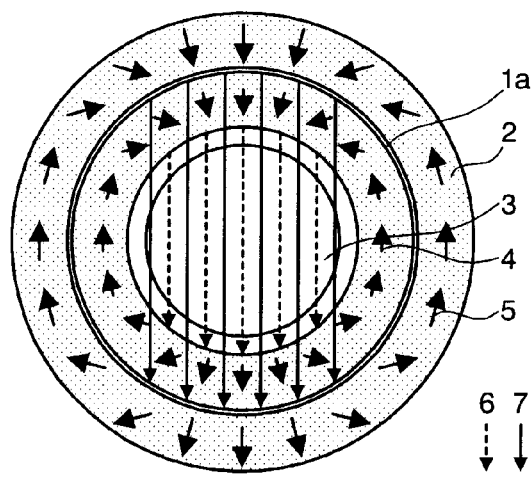
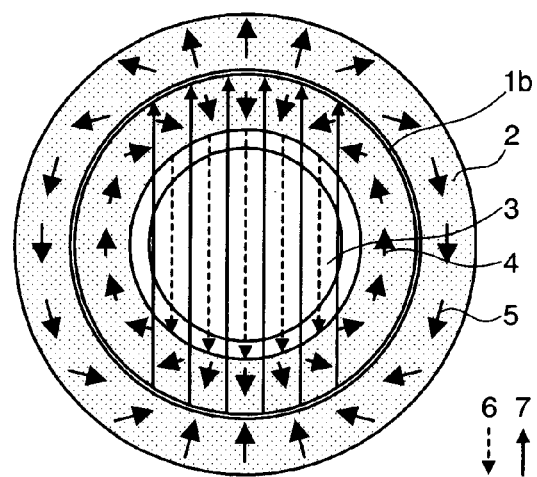

FIG. 15
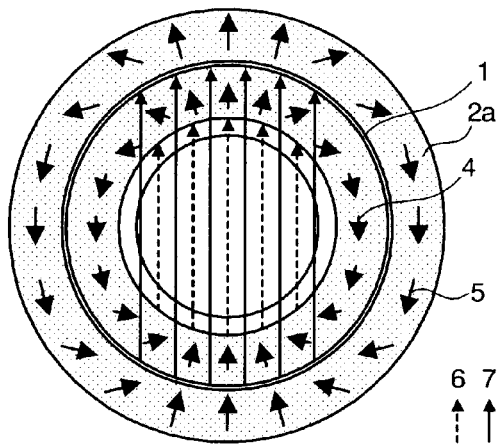
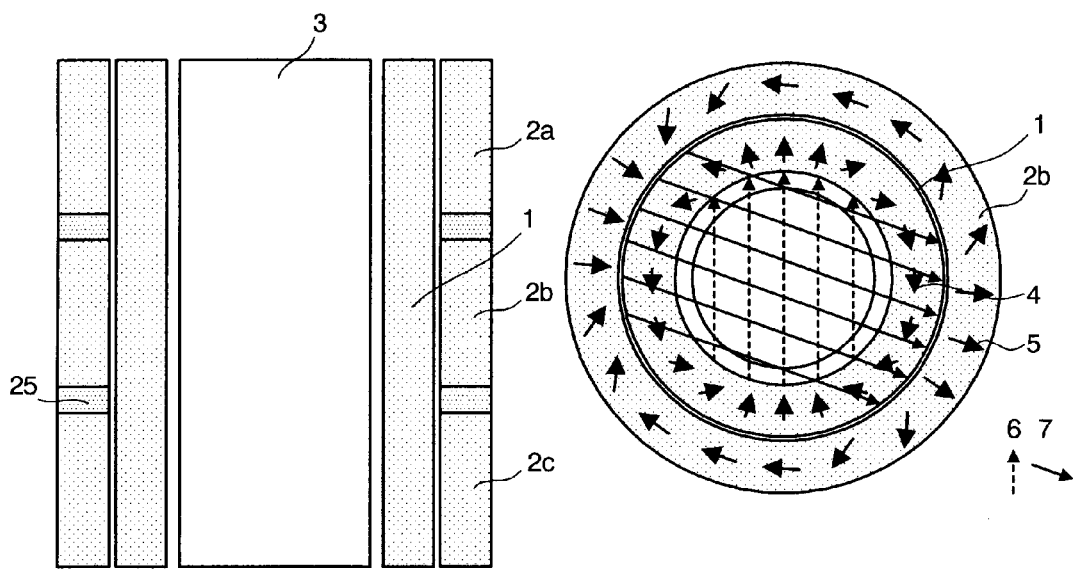
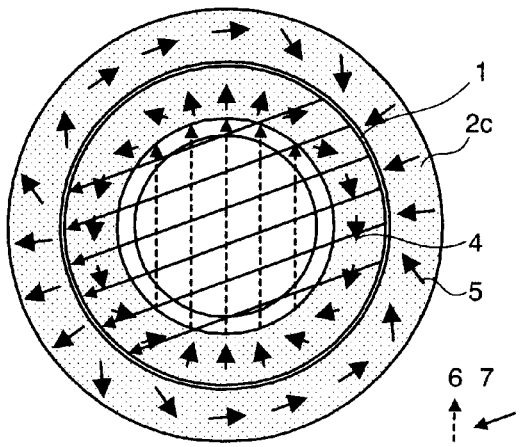

(a)  (b)

MAGNETIC REFRIGERATING DEVICE AND MAGNETIC REFRIGERATING METHOD

CROSS-REFERENCE TO RELATED APPLICATIONS

This application is based upon and claims the benefit of priority from the prior Japanese Patent Application No. 2006-265832, filed on Sep. 28, 2006; the entire contents of which are incorporated herein by reference.

BACKGROUND OF THE INVENTION

1. Field of the Invention

The present invention relates to a magnetic refrigeration device and a magnetic refrigeration method which can simplify the driving mechanism by conducting the heat transfer utilizing the solid heat conduction not requiring a liquid medium or a gaseous medium for the heat transfer.

2. Description of the Related Art

When the intensity of magnetic field to be applied is changed for a certain magnetic material, the temperature of the magnetic material also changes, which is called as a "magneto-caloric effect". Physically, the degree of freedom of magnetic spins (electrons bearing the magnetic property) in the magnetic material is changed with the change of the external magnetic field so that the entropy of the magnetic spins is changed. In this case, the rapid energy exchange between the electrons and the lattice in the magnetic material occurs so as to change the temperature of the magnetic material which is concerned with the lattice vibration. The refrigerating operation based on the magneto-caloric effect as above-mentioned are called as a "magnetic refrigeration".

At present, a gas compressing and expanding cycle refrigeration technique is widely used for practical application in daily life such as a refrigerator, a freezer and an air conditioning. However, in the refrigeration technique using the gas compressing and expanding cycle such as a chlorofluorocarbon (CFC) or hydrochlorofluorocarbon (HCFC) or hydrofluorocarbon (HFC) gas, there are some problems relating to the ozone layer destruction or the global warming caused by the environmental exhaust of those gasses.

Therefore, it is desired that a clean refrigeration technique with no harm gas medium and high efficiency without the environmental destruction caused by the exhaust of working gas is realized. Recently, the magnetic refrigeration technique near room temperature region is intensely researched and developed which is expected as an environment-friendly refrigeration.

As the magnetic refrigeration technique, the AMR (Active Magnetic Regenerative Refrigeration) system is proposed by "Barclay" in US (refer to U.S. Pat. No. 4,332,135). The AMR system is considered in view of the fact that the entropy of the lattice part is relatively larger than the entropy of the electronic part near room temperature range due to the thermal disturbance so that the temperature change of the magnetic material originated from the magneto-caloric effect becomes small. With the AMR system, therefore, the lattice entropy, which is considered as a problem for the magnetic refrigeration in high temperature range, is positively utilized. Namely, with the AMR system, the magnetic material works as not the magnetic refrigerant but also the magnetic regenerator in the magnetic refrigerating operation.

The AMR system is characterized in that the heat transfer is controlled in the magnetic refrigerant so as to a temperature gradient is generated effectively in the magnetic refrigerant by utilizing both of the works of magnetic refrigeration and the regeneration. Concretely, the magnetic refrigerant is divided into a plurality of pieces which are to be arranged so that the direct heat transfer between the pieces can be suppressed, ie; the heat is transferred only through the small contact area of the adjacent pieces. In this case, the coldness generated at each piece is transferred to the other piece mainly via the heat transfer medium (liquid or gas) by the heat exchange between the magnetic refrigerant and the heat transfer medium.

In this case, it is required the flow path of the heat transfer medium through the magnetic refrigerant is secured and the sufficient heat exchange between the magnetic refrigerant and the heat transfer medium is conducted. Therefore, the magnetic refrigerant should be configured so as to have the shape with a large specific surface area and securing the sufficient flow path of the heat transfer medium. Therefore, it is appropriate that the magnetic refrigerant shaped in honeycomb by folding the processed plate in cornice and packed into a magnetic refrigerating container (AMR bed). It is also appropriate that the magnetic refrigerant shaped as a mesh-like laminated body and packed into an AMR bed, or that the magnetic refrigerant processed in particle of spherical shape and packed into an AMR bed.

Zimm, Gschneidner and Pecharsky made the prototype of the AMR system and realized the continuous steady operation of the magnetic refrigerating cycle near room temperature range (region) (1997). In this case, gadolinium (Gd) metal was employed as the magnetic refrigerant which is shaped into spherical particles with the size of about 0.3 mm in diameter and packed into an AMR bed.

Since the adjacent spherical particles of Gd are point-contacted with one another, the mutual heat conduction between the particles can be allowed at low level. The inlet and the outlet of the heat transfer medium are provided at both ends of the AMR bed so that the heat transfer medium can be introduced into and discharged from the AMR bed. As the heat transfer medium, water or a mixture of water and ethanol was employed. The AMR bed was put into place the inside of coil of superconducting solenoid magnet (SM; superconducting solenoid magnet). The AMR can be displaced with reciprocating motion upward and downward along the axis of the SM coil, and inside and outside of the bore of SM coil so that the intensity of the magnetic field to be applied to the magnetic refrigerant in the AMR bed can be varied by displace the location of the AMR bed.

The AMR cycle of refrigeration can be conducted as follows: (1) The AMR bed is put into the bore of the SM coil, and the magnetic field is applied to the magnetic refrigerant thereby the magnetic refrigerant heat up. (2) The heat transfer medium is flowed through the magnetic refrigerant in the AMR bed from the one end to the other end of the AMR bed and transfer the thus generated hotness. (3) The AMR bed is removed from the bore of the SM coil to remove the magnetic field applied to the magnetic refrigerant, thereby the magnetic refrigerant cool down. (4) The heat transfer medium is flowed from the other end to the one end of the AMR bed (the direction opposite to the direction in the Step (2)) and transfer the coldness.

By repeating the heat cycle of Steps (1)-(4), a temperature gradient can be generated in the magnetic refrigerant packed into the AMR bed. To begin with the magnetic refrigerant heat up by applying a magnetic field to the refrigerant, and the hotness is transferred from the magnetic refrigerant to the heat transfer medium. Then, the hotness transports with the heat transfer medium by flowing forward direction and then, hotness transferred from the heat transfer medium to the magnetic refrigerant. Likewise, the magnetic refrigerant cool down by removing the magnetic field from the refrigerant, and the coldness is transferred from the heat transfer medium to the magnetic refrigerant. In this case, the coldness transports with the heat transfer medium by flowing backward direction and then, coldness transferred from the heat transfer medium to the magnetic refrigerant.

Namely, the intended heat transfer is mainly conducted by the indirect heat conduction via the heat transfer medium, not by the direct heat conduction via the point contact between the particles of the magnetic refrigerant. In addition, since each particle stores the corresponding heat generated by the heat cycle, the difference in temperature between the adjacent particles is generated so that the temperature gradient is generated in the direction along the heat flow by the heat transfer medium. In the steady state, therefore, a large difference in temperature can be generated between both ends of the AMR bed.

According to Zimm et al., the thermal difference is generated at both ends of the AMR bed by $\Delta T$=about 30° C. by changing the intensity of the magnetic field from zero to 5T with the superconducting magnet near room temperature range. Then, a high refrigerating efficiency of COP=15 (not containing the input power for the SM) can be realized under the condition of $\Delta T$=about 13° C. With the conventional technique using gas compressing and expanding cycle of Freon gas, e.g., in a refrigerator of household use, the refrigerating efficiency of only COP=1-3 can be realized.

| [Reference 1] | U.S. Pat. No. 4,332,135 |
| [Reference 2] | U.S. Pat. No. 5,743,095 |
| [Reference 3] | C. Zimm, et al., Advances in Cryogeneric Engineering, Vol. 43 (1998), p. 1759 (Consideration of size and simplification in magnet) |

In the above-described embodiment, however, the superconducting magnet (SM) is employed in order to apply the high magnetic field, e.g., 5T to the magnetic refrigerating working material. Since operating the superconducting magnet (SM) requires the extreme low temperature of about 10K, which needs a liquid helium or a refrigerator for generating extreme low temperature. Therefore, the magnetic refrigeration system is grown in size.

An electromagnet (EM) may be employed instead of the superconducting magnet (SM). With the electromagnet (EM), in order to generate a magnetic field in the intensity of 1T or over, a large current must be applied to the electromagnet (EM) so as to require the water cooling system for removing the Joule heat generation from the electromagnet (EM). Therefore, the magnetic refrigeration system becomes complicated, grows in size and requires high operation cost in the same manner as the superconducting magnet.
(Problem in Use of Heat Transfer Medium in the AMR)

In order to realize the AMR system in the above-described embodiment, the magnetic refrigerant is processed in spherical particle so that the thus obtained particles can be packed into the AMR bed and the heat transfer medium is made of a mixture of water and ethanol. Namely, the heat is transferred from one end to the other end of AMR bed mainly by flowing the liquid transfer medium through the heat exchange between the solid particles and the liquid transfer medium, not by the direct heat conduction of the solid particles. Therefore, the liquid or gaseous heat transfer medium is required in addition to the solid magnetic refrigerant. Moreover, the driving mechanism to move the heat transfer medium is also required.

In the case that the magnetic refrigeration is conducted near room temperature region, the liquid heat transfer medium is better than the gaseous medium in view of the heat capacity. The wet type magnetic refrigerating device using the liquid heat transfer medium has some disadvantages such as handling and complicated design.
(Problem in Use of Heat Transfer Medium in the AMR)

In the case that the heat transfer is conducted by the heat transfer medium, the magnetic refrigerant is subjected to the pressure shock of the flow of the heat transfer medium. In the case that the magnetic refrigerant is brittle, the magnetic refrigerant may be cracked by the repeated pressure shock. In this case, fine powders may be generated due to the crack of the magnetic refrigerant so as to disturb the flow of the heat transfer medium and thus, to deteriorate the performance of the magnetic refrigerating system.

Particularly, in the case that the spherical particles of the magnetic refrigerant are packed into the AMR bed, the fine powders may be generated by the collision between the particles and the crash of the particles against the inner wall of the AMR bed. In this case, the flow path in the packed particles can not be maintained so as to increase the pressure loss of the heat transfer medium and thus, to deteriorate the refrigerating performance of the magnetic refrigerating system. Even though the magnetic refrigerant can exhibit a large magneto-caloric effect, it becomes difficult to use the magnetic refrigerant if the magnetic refrigerant can not exhibit enough mechanical strength against the repeated pressure shock.
(Problem Relating to Effective Use of Magnetic Field)

In order to mitigate the growth in size of the magnet system, it is preferable to employ a permanent magnet. However, the permanent magnet can generate a magnetic field in intensity much smaller than the superconducting magnet. In the case that the magnetic refrigerant is packed into the AMR bed and the magnetic field is applied to the magnetic refrigerant by the permanent magnet, the affect of the demagnetization field is largely, in comparison with the coil-type magnet of superconducting magnet or the electromagnet.

In this point of view, it is desired in view of thermal design that appropriate for the AMR system, the AMR bed to accommodate the magnetic refrigerant is shaped in column such as cylindrical column or rectangular column so that the long direction of the AMR bed can correspond to the heat flow. The reason is that in the AMR system, the temperature gradient is formed in the direction of the heat flow utilizing the heat storage of the magnetic refrigerant so as to generate the temperature difference at both ends of the AMR bed.

Generally, when the magnetic field is applied to a magnetic material, the thus generated demagnetization field strongly depends on the geometrical shape of the magnetic material. In the case that the magnetic material is shaped in column, the demagnetization field becomes minimum when the magnetic field is applied along the long direction of the magnetic material and the demagnetization field becomes maximum when the magnetic field is applied along the width direction of the magnetic material. In the use of the superconducting magnet or the electromagnet, the magnetic field is generated in the bore space of the magnet coil along the center axis of the magnet coil. Therefore, when the columnar AMR bed is disposed in the bore space of the coil, the magnetic field can be applied to the AMR bed along the long direction (the center axis of the bore space of the coil) by increasing the aspect ratio of the AMR bed because the aspect ratio of the height and the diameter of the AMR bed can be controlled freely. In this case, therefore, the AMR bed is unlikely to suffer from the demagnetization field.

On the other hand, the permanent magnet can be configured as a face-type U-shaped magnet with a magnetic yoke or a Halbach-type magnet. With the U-shaped magnet, the magnetic field to be generated depends on the ratio of the magnet volume to the space gap volume. In order to increase the intensity of the magnetic field, it is required to narrow the space gap. In the use of the U-shaped magnet, when the columnar AMR bed is disposed in the space gap, the magnetic field is applied to the AMR bed along the width direction.

With the Halbach-type magnet, the magnetic field is generated in the bore space of the magnet along the width direction of the bore space. As a result, when the columnar AMR bed is disposed in the bore space, the magnetic field is applied to the AMR bed along the width direction. In this way, even though the Halbach-type magnet is employed, the thus generated magnetic field is applied along the width direction of the AMR bed. Therefore, when the permanent magnet is employed as a magnet in the AMR system, there are some disadvantages such as the large reduction of the intensity of the magnetic field, which is to be applied to the magnetic refrigerant accommodated in the AMR bed, originated inherently from the use of the permanent magnet and from the large demagnetization field due to the geometrical shape of the AMR bed which is restricted in design.

BRIEF SUMMARY OF THE INVENTION

It is an object of the present invention, in view of the above-described problems relating to the magnetic refrigerating system near room temperature region, to provide a small and simple magnetic refrigerating device and a magnetic refrigerating method which do not require fluid flow such as liquid flow or gas flow in the heat transfer.

In order to achieve the above object, an aspect of the present invention relates to a magnetic refrigerating device, including: a magnetic refrigerating unit including a magnetic material "A" exhibiting a magneto-caloric effect that the temperature of the material "A" is increased by the application of a magnetic field and the temperature of the material "A" is decreased by the removal of a magnetic field, a magnetic material "B" exhibiting a magneto-caloric effect that the temperature of the material "B" is decreased by the application of a magnetic field and the temperature of the material "B" is increased by the removal of a magnetic field, a heat conductive material "a" exhibiting higher heat conductivity under the application of a magnetic field and lower heat conductivity under the removal of a magnetic field, and a heat conductive material "b" exhibiting lower heat conductivity under the application of a magnetic field and higher heat conductivity under the removal of a magnetic field, wherein the magnetic refrigerating unit is configured so as to include at least one layered structure denoted by "AaBb" which is formed by subsequently stacking the materials "A", "a", "B", "b" or at least one layered structure denoted by "AbBa" which is formed by subsequently stacking the materials "A", "b", "B", "a"; and a magnetic field-applying means to apply a magnetic field to the magnetic refrigerating unit.

Another aspect of the present invention relates to a magnetic refrigerating method, including: applying a first magnetic field with a first intensity to a magnetic refrigerating unit including a magnetic material "A" exhibiting a magneto-caloric effect that the temperature of the material "A" is increased by the application of a magnetic field and the temperature of the material "A" is decreased by the removal of a magnetic field, a magnetic material "B" exhibiting a magneto-caloric effect that the temperature of the material "B" is decreased by the application of a magnetic field and the temperature of the material "B" is increased by the removal of a magnetic field, a heat conductive material "a" exhibiting higher heat conductivity under the application of a magnetic field and lower heat conductivity under the removal of a magnetic field, and a heat conductive material "b" exhibiting lower heat conductivity under the application of a magnetic field and higher heat conductivity under the removal of a magnetic field, wherein the magnetic refrigerating unit is configured so as to include at least one layered structure denoted by "AaBb" which is formed by subsequently stacking the materials "A", "a", "B", "b" or at least one layered structure denoted by "AbBa" which is formed by subsequently stacking the materials "A", "b", "B", "a"; and applying a second magnetic field with a second intensity smaller than the first intensity to the magnetic refrigerating unit, wherein the thus generated heat is transferred from one end to the other end of the magnetic refrigerating unit.

According to the aspects of the present invention, the magnetic refrigerating unit is configured so as to contain at least one stacking unit of the materials "A", "B", "a" and "b", and the intended heat transfer is conducted from one end to the other end of the magnetic refrigerating unit by utilizing the repeated heat generation and heat insulation originated from the materials "A", "B", "a" and "b" when a magnetic field is applied to and removed from the magnetic refrigerating unit. Therefore, since the heat transfer can be conducted as a solid transfer via the constituent materials of the magnetic refrigerating unit, the magnetic refrigerating unit may not be cracked by the repeated pressure shock of the liquid transfer medium as the AMR type magnetic refrigeration.

In the AMR type magnetic refrigeration using a permanent magnet, the magnetic refrigerant and the permanent magnet are arranged so that the applying direction of a magnetic field to the magnetic refrigerant is perpendicular to the direction of the heat flow so as to develop the space utilizing efficiency. In this case, since the long direction of the magnetic refrigerating working chamber containing the magnetic refrigerant therein corresponds to the direction of the heat flow when the magnetic material is charged in the container (AMR bed), the magnetic field can not be effectively applied to the magnetic refrigerant because the magnetic refrigerant largely suffers from the demagnetization field which is originated from the application of the magnetic field to the magnetic refrigerant in the width direction thereof. In the aspects of the present invention, in contrast, since the magnetic refrigerant (unit) is divided and stacked along the direction of the heat flow, the magnetic field can be applied to each divided magnetic material layer along the long direction thereof so that each divided magnetic material layer does not almost suffer from the demagnetization field.

In an embodiment of the present invention, the magnetic field-applying means may be a superconducting magnet. Then, the magnetic field-applying means may be a permanent magnet. The permanent magnet may be a Halbach-type magnet.

In this way, although the permanent magnet can be used as the magnetic field-applying means, the superconducting magnet and thus, the electromagnet may be employed as the magnetic field-applying means. Therefore, the variation of the choice of magnetic field-applying means can be increased. The above-described effect/function can be realized irrespective of the kind of magnet.

The permanent magnet is a double-structured Halbach-type magnet composed of an inner Halbach-type magnet and an outer Halbach-type magnet, wherein the magnetic refrigerating unit is disposed in the bore space of the inner Halbach-type magnet. In this case, if only the inner Halbach-type magnet and the outer Halbach-type magnet are relatively shifted, a first magnetic field and a second magnetic field with the respective different intensities can be applied to the magnetic refrigerating unit. Namely, the first magnetic field and second magnetic field with the respective different intensities can be applied to the magnetic refrigerating unit only by rotating operation of the magnet. As a result, the thus generated heat can be transferred in the magnetic refrigerating unit and thus, the intended magnetic refrigeration can be realized by simple rotating operation without heat transfer medium and its drive mechanism.

In this case, preferably, the outer Halbach-type magnet is rotated while the relative position between the inner Halbach-type magnet and the magnetic refrigerating unit disposed in the bore space of the inner Halbach-type magnet is fixed. Therefore, the relative rotation can be easily conducted under the condition without the frictional heat generation between the inner Halbach-type magnet and the magnetic refrigerating unit disposed in the bore space of the inner Halbach-type magnet. As a result, the thus generated heat can be transferred in the magnetic refrigerating unit and thus, the intended magnetic refrigeration can be realized.

At least one of the inner Halbach-type magnet and the outer Halbach-type magnet may be composed of a plurality of Halbach-type magnets which are configured such that the direction of a magnetic field generated from an inner Halbach-type magnet is different from the direction of the magnetic fields generated from the other inner Halbach-type magnets. In this case, the plurality of Halbach-type magnets are stacked along a flow direction of heat generated. Therefore, the total magnetic torque can be reduced due to the fact that the magnetic torque generated from one set of magnetic refrigerating unit and magnet can be cancelled by the magnetic torques generated from another sets of magnetic refrigerating unit and magnet so that the motive energy load for rotating the outer Halbach-type magnet relatively for the inner Halbach-type magnet can be reduced.

In the case that the magnetic field-applying means is not constituted from the double-structured Halbach-type magnet, a driving mechanism is utilized to shift the relative position between the magnetic refrigerating unit and the magnets. In this case, too, the first magnetic field and second magnetic field with the different intensity can be applied to the magnetic refrigerating unit so that the thus generated heat can be transferred in the magnetic refrigerating unit and the intended magnetic refrigeration can be realized.

According to the aspect of the present invention can be provided a small and simple magnetic refrigerating device without heat transfer medium and its drive mechanism and a magnetic refrigerating method which do not require fluid flow such as liquid flow or gas flow in the heat transfer.

BRIEF DESCRIPTION OF THE SEVERAL VIEWS OF THE DRAWINGS

FIG. 3 is a structural view illustrating another magnetic refrigerating device using the magnetic refrigerating unit in FIG. 1.

FIG. 4 is an explanatory view for the heat transfer in the magnetic refrigerating unit in the embodiment.

FIG. 7 is a structural view illustrating a permanent magnet (Halbach-type magnet) in a further embodiment of the magnetic refrigerating device according to the present invention.

FIG. 8 is a structural view illustrating the magnetic refrigerating device in the embodiment.

FIG. 9 is an explanatory view for the heat transfer in the magnetic refrigerating unit in the embodiment.

FIG. 10 is a structural view schematically illustrating the magnetic refrigerating device in FIG. 8 which contains a driving mechanism.

FIG. 11 is a structural view illustrating a further magnetic refrigerating device according to the present invention.

FIG. 12 is an explanatory view for the heat transfer in the magnetic refrigerating device in FIG. 11.

FIG. 13 is a structural view illustrating a still further magnetic refrigerating device according to the present invention.

FIG. 15 is a structural view illustrating still another magnetic refrigerating device according to the present invention.

DETAILED DESCRIPTION OF THE INVENTION

Hereinafter, the present invention will be described in detail with reference to the drawings.

Figure 1:
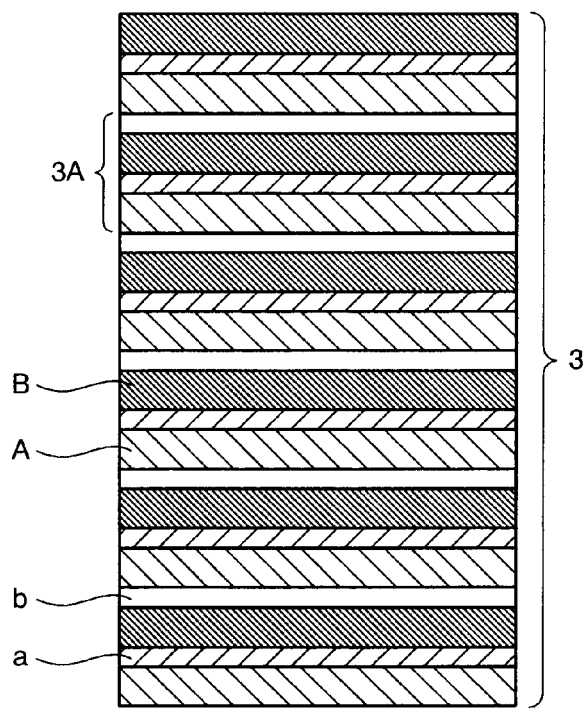
FIG. 1 is a schematic view illustrating a magnetic refrigerating unit of a magnetic refrigerating device according to an embodiment of the present invention.
Figure 2:
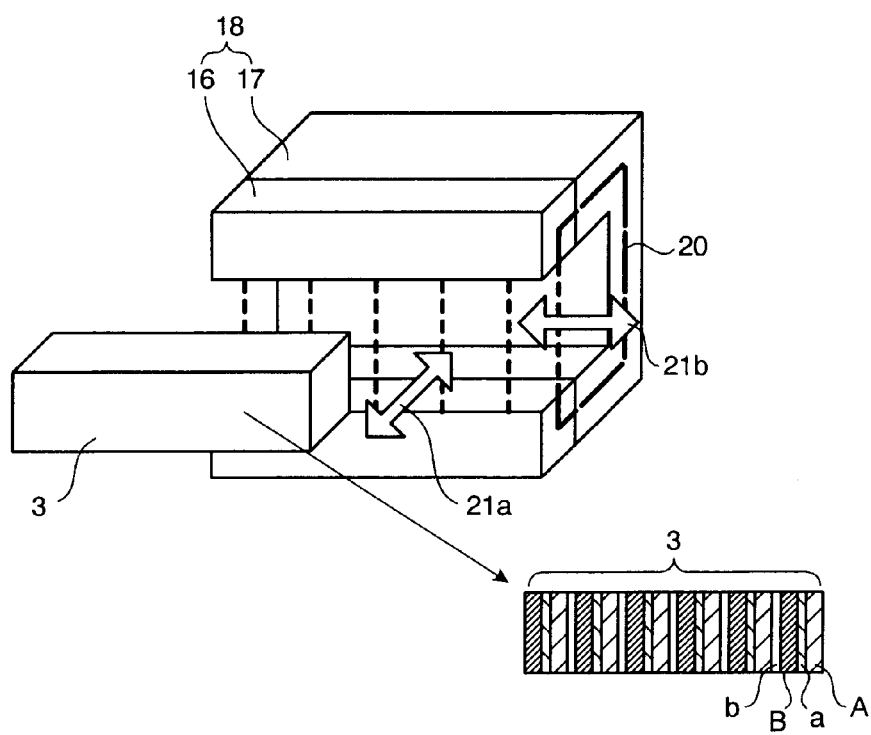
FIG. 2 is a structural view illustrating a magnetic refrigerating device using the magnetic refrigerating unit in FIG. 1.

FIG. 1 is a schematic view illustrating the magnetic refrigerating device according to an embodiment of the present invention. FIGS. 2 and 3 are structural views illustrating concrete embodiments relating to the magnetic refrigerating device in FIG. 1, respectively. FIG. 4 is an explanatory view for the magnetic refrigerating heat cycle in the magnetic refrigerating device in FIG. 1. Herein, FIG. 2 is a perspective view illustrating the concrete embodiment of the magnetic refrigerating device in this embodiment.

Like or corresponding components are designated by the same reference numerals throughout the drawings.

In FIG. 1, a magnetic refrigerating unit 3 of the magnetic refrigerating device in this embodiment is composed of magnetic materials "A" and "B" and heat conductive materials "a" and "b". The magnetic material "A" exhibits the magneto-caloric effect that the temperature of the material "A" is increased by the application of the magnetic field and the temperature of the material "A" is decreased by the removal of the magnetic field. The magnetic material "B" exhibits the magneto-caloric effect that the temperature of the material "B" is decreased by the application of the magnetic field and the temperature of the material "B" is increased by the removal of the magnetic field. The heat conductive material "a" exhibits higher heat conductivity under the application of the magnetic field and lower heat conductivity under the removal of the magnetic field. The heat conductive material "b" exhibits lower heat conductivity under the application of the magnetic field and higher heat conductivity under the removal of the magnetic field. In this embodiment, the materials A, a, B, b are subsequently stacked to form the layered structure denoted by "AaBb". The layered structure "AaBb" constitutes one magnetic refrigerating unit 3A so that the magnetic refrigerating unit 3 includes at least one magnetic refrigerating unit 3A.

In this embodiment relating to FIGS. 1 and 2, the magnetic refrigerating device includes six magnetic refrigerating units 3A, but may include any number of magnetic refrigerating unit 3A. As will be described below, since the heat is flowed along the stacking direction of "AaBb", the direction of the heat flow correspond to the stacking direction of "AaBb".

In FIG. 2, the reference numeral "3" designates the magnetic refrigerating unit which is schematically illustrated in FIG. 1 as described above. The reference numeral "18" designates a U-shaped permanent magnet, and the reference numerals "16" and "17" designate the magnetic pole of the permanent magnet 18 and a magnetic yoke. The magnetic refrigerating unit 3 may be accommodated into a container (not shown) as occasion demands.

The magnetic refrigerating unit 3 is provided proximate to the U-shaped permanent magnet 18, and is repeatedly introduced into and taken out from the gap of the U-shaped permanent magnet 18 by shifting the relative position between the magnetic refrigerating unit 3 and the U-shaped permanent magnet 18 with a (not shown) driving mechanism.

In FIG. 3(a), the magnetic refrigerating unit 3 is relatively shifted along the direction designated by the arrow 21a so that the relative position between the magnetic refrigerating unit 3 and the U-shape permanent magnet 18 is changed. In FIG. 3(b), the magnetic refrigerating unit 3 is relatively shifted along the direction designated by the arrow 21b so that the relative position between the magnetic refrigerating unit 3 and the U-shape permanent magnet 18 is changed.

When the magnetic refrigerating unit 3 is relatively shifted against the U-shaped permanent magnet 18, the magnetic refrigerating unit 3 and the U-shaped permanent magnet 18 are thermally insulated from one another by the airgap formed between the magnetic refrigerating unit 3 and the U-shaped permanent magnet 18. In this case, the heat transfer between the magnetic refrigerating unit 3 and the U-shaped permanent magnet 18 can be suppressed.

As illustrated in FIGS. 2 and 3, the pair of magnetic poles 16, which are disposed opposite to one another, constitutes the U-shaped magnetic circuit with the magnetic yoke 17 so as to form the magnetic path 17 and thus, generate the magnetic field in the gap.

Then, the heat transfer mechanism of the magnetic refrigerating device in this embodiment will be described hereinafter. When the magnetic refrigerating unit 3 is disposed in the gap of the U-shaped permanent magnet 18 by the driving mechanism (not shown), the magnetic field is applied to the magnetic refrigerating unit 3 so that the temperature of the magnetic material "A" is increased and the temperature of the magnetic material "B" is decreased. In this case, since the material "a" exhibits higher heat conductivity and the material "b" exhibits lower heat conductivity, in the magnetic refrigerating unit 3, the heat is flowed from the magnetic material "A" to the magnetic material "B" via the material "a" (denoted by the arrow 8 in FIG. 4(a)).

On the other hand, when the magnetic refrigerating unit 3 is drawn away from the gap of the U-shaped permanent magnet 18 by the driving mechanism (not shown), the magnetic field is removed from the magnetic refrigerating unit 3 so that the temperature of the magnetic material "A" is decreased and the temperature of the magnetic material "B" is increased. In this case, since the material "a" exhibits lower heat conductivity and the material "b" exhibits higher heat conductivity, in the magnetic refrigerating unit 3, the heat is flowed from the magnetic material "B" to the magnetic material "A" via the material "b" (denoted by the arrow 8 in FIG. 4(b)).

In the case that the magnetic refrigerating unit 3 is relatively shifted against the U-shaped permanent magnet 18, only if the magnetic refrigerating unit 3 is disposed in the gap of the permanent magnet 18 and is repeatedly introduced into and taken out from the gap of the permanent magnet 18, the shifting direction may be set to the direction designated by arrow 21a or 21b in FIG. 3.

Figure 5:
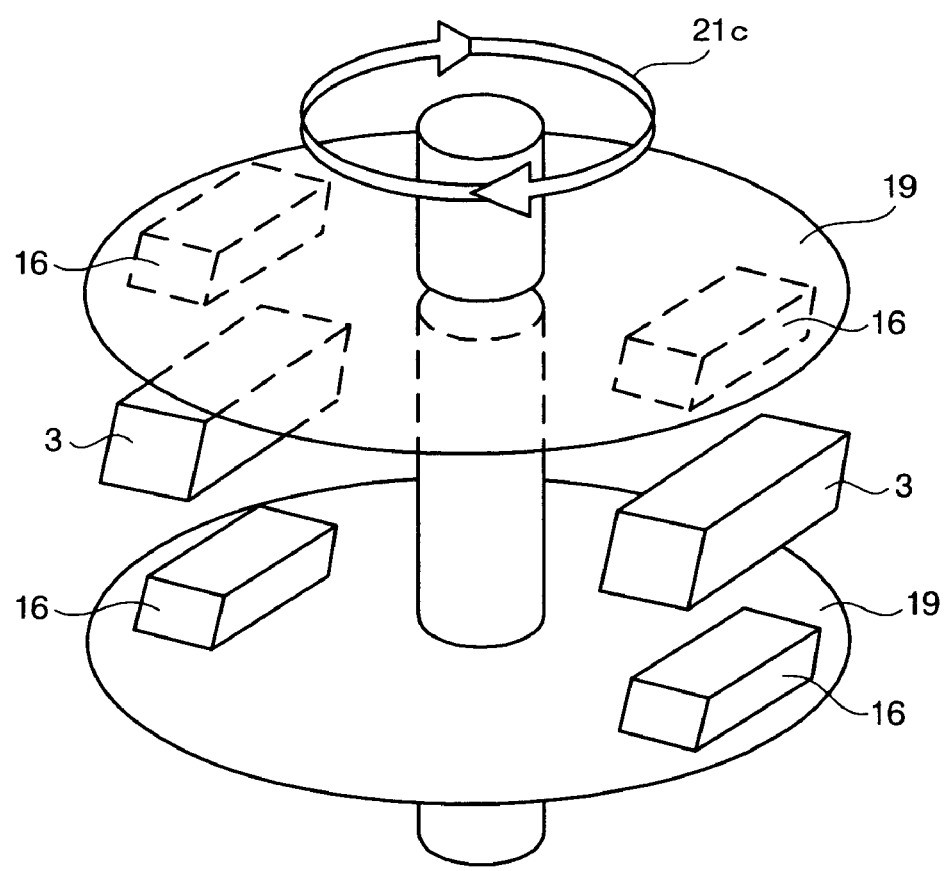
FIG. 5 is a structural view illustrating still another magnetic refrigerating device modified from the one in the embodiment relating to FIGS. 1-4.

FIG. 5 is a structural view illustrating a magnetic refrigerating device modified from the magnetic refrigerating device in FIG. 3. In this embodiment, the relative position of the U-shaped permanent magnet 18 is shifted by rotating the turntable 19, which is designated by the arrow 21c, on which the permanent magnet 18 is mounted. In this case, too, when the relative position between the magnetic refrigerating unit 3 and the permanent magnet 18 is shifted, the magnetic refrigerating unit 3 is repeatedly magnetized and demagnetized so that the thus generated heat is flowed in one direction. As shown in FIG. 4, the heat transfer is conducted along the stacking direction of "AaBb". In this embodiment, the magnetic refrigerating unit 3 is mounted on the turntable 19 with a (not shown) jig.

Figure 6:
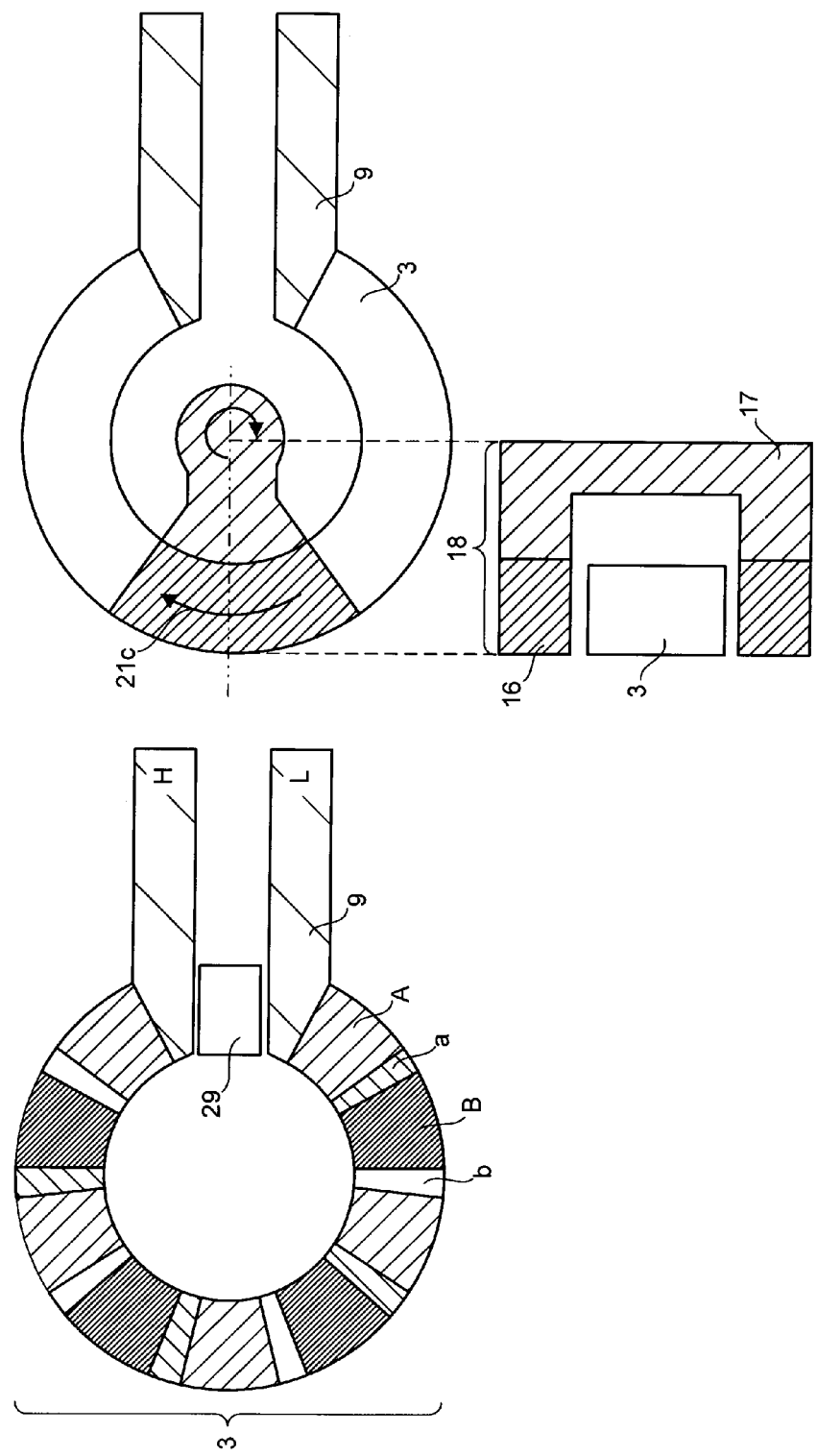
FIG. 6 is a structural view illustrating a concrete modified embodiment of the magnetic refrigerating device in FIG. 5.

FIG. 6 is a schematic view illustrating a magnetic refrigerating device modified from the magnetic refrigerating device in FIG. 3. In this embodiment, the magnetic refrigerating unit 3 is configured in a circle structure, not in stacking structure as shown in FIG. 1. In this embodiment, since the thus generated heat is flowed along the arranging direction of the materials constituting the magnetic refrigerating unit 3, the constituent materials of the magnetic refrigerating unit 3 is arranged along the heat flow. In FIG. 6, the reference numeral "9" designates a heat conductive member. In this embodiment, the circle-shaped magnetic refrigerating unit 3 is rotated in the direction designated by the arrow 21c so as to be vertically sandwiched by the U-shaped permanent magnet 18. As a result, in this embodiment, the thus generated heat is transferred from the L side of the heat conductive member 9 to the H side of the heat conductive member 9 in a clockwise direction along the circle shape of the magnetic refrigerating unit 3.

If a material to be refrigerated of a device different from the magnetic refrigerating device is connected with the L side of the heat conductive member 9 and a heat exhaust member is connected with the H side of the heat conductive member 9, the intended magnetic refrigeration can be realized. The magnetic refrigerating unit 3 is configured as a single unit, but may be as a plurality of units which are connected in series or in parallel with the one another. When the plurality of units are connected in parallel with one another, the refrigerating performance (absorbing heat quantity) can be enhanced. When the plurality of units are connected in series with one another, the difference in temperature between the material to be refrigerated and the heat exhaust member can be enhanced.

FIGS. 7 to 9 relates to another magnetic refrigerating device according to the present invention, respectively. FIG. 7 shows the fundamental structure of the permanent magnet (Halbach-type magnet) to be utilized in this embodiment. FIG. 8 is a structural view schematically showing the magnetic refrigerating device in this embodiment. FIG. 9 is an explanatory view for the heat transfer in the magnetic refrigerating device in this embodiment.

In above-described embodiment, the U-shaped permanent magnet to form the corresponding U-shaped magnetic circuit is employed as a magnetic field-applying means for the magnetic refrigerating unit. In this embodiment, the Halbach-type magnet is employed instead of the U-shaped permanent magnet. As shown in FIG. 7(a), the Halbach-type magnet has a hollow structure and is configured such that the magnetic field lines 7 are concentrated in the hollow space so as to generate a magnetic field with higher intensity therein by controlling the magnetic anisotropy of each constituent material of the Halbach-type magnet (e.g., as designated by the arrow 5).

Only if the Halbach-type magnet can generate the magnetic field with higher intensity in the hollow space, the Halbach-type magnet may be formed in any shape. For example, the Halbach-type magnet may be formed in columnar shape as shown in FIG. 7(*a*) and may be in rectangularly columnar shape as shown in FIG. 7(*b*).

FIG. 8 is a structural view schematically showing the magnetic refrigerating device in this embodiment. FIG. 8(*a*) is directed at the schematic cross section of the magnetic refrigerating device in this embodiment, and FIG. 8(*b*) is directed at the top plan view of the magnetic refrigerating device. In FIG. 8, the reference numeral "3" designates the magnetic refrigerating unit formed in the same manner as the one in the embodiment relating to FIG. 1. The reference numerals "1" and "2" designate an inner Halbach-type magnet and an outer Halbach-type magnet which is disposed outside the inner Halbach-type magnet, respectively. The inner Halbach-type magnet 1 and the outer Halbach-type magnet 2 constitute the double-structured Halbach-type magnet.

The magnetic refrigerating unit 3 is disposed in the bore space of the inner Halbach-type magnet 1. The outer Halbach-type magnet 2 is joined with a (not shown) rotating mechanism to be rotated coaxially around the center axis of the inner and the outer Halbach-type magnets. The rotating mechanism may be configured as an outer motor or a gear type rotating mechanism. With the gear type rotating mechanism, some gears are formed at the outer side of the outer Halbach-type magnet 2.

With the double-structured Halbach-type magnet, a gap is formed between the inner Halbach-type magnet 1 and the outer Halbach-type magnet 2 so as not to make friction therebetween when the outer Halbach-type magnet 2 is rotated. The magnetic refrigerating unit 3 is thermally insulated from the inner Halbach-type magnet 1 so as not to generate the heat transfer between the inner Halbach-type magnet 1 and the magnetic refrigerating unit 3. The gap may be rendered a simple space or infiltrated with a thermal insulating material.

FIG. 9 is an explanatory view for the heat transfer in the magnetic refrigerating device in FIG. 8. In FIGS. 9(*a*) and (*b*), the reference numerals "4" and "5", designate the directions of magnetic anisotropy of the inner Halbach-type magnet 1 and the outer Halbach-type magnet 2. In FIG. 9(*a*), the direction of the magnetic field 6 generated by the inner Halbach-type magnet 1 via the bore space thereof becomes parallel to the direction of the magnetic field 7 generated by the outer Halbach-type magnet 2 via the bore space thereof so as to generate a magnetic field with high intensity in the bore space.

In FIG. 9(*b*), the direction of the magnetic field 6 generated by the inner Halbach-type magnet 1 via the bore space thereof becomes antiparallel to the direction of the magnetic field 7 generated by the outer Halbach-type magnet 2 via the bore space thereof so as to generate a magnetic field with low intensity in the bore space because the magnetic field generated from the inner Halbach-type magnet 1 is at least partially cancelled by the magnetic field generated from the outer Halbach-type magnet 2. In the latter case, if the intensity of the magnetic field from the inner Halbach-type magnet 1 is set almost equal to the intensity of the magnetic field from the outer Halbach-type magnet 2, the magnetic field generated in the bore space can be set almost zero.

Namely, in FIG. 9(*a*), the magnetic refrigerating unit 3 is disposed in the bore space of the inner Halbach-type magnet 1 so that the direction of the magnetic field generated from the inner Halbach-type magnet 1 becomes parallel to the direction of the magnetic field generated from the outer Halbach-type magnet 2, thereby applying the magnetic field with high intensity to the magnetic refrigerating unit 3. In FIG. 9(*b*), since the direction of the magnetic field generated from the inner Halbach-type magnet 1 becomes antiparallel to the direction of the magnetic field generated from the outer Halbach-type magnet 2 and thus, cancelled, no magnetic field is applied to the magnetic refrigerating unit 3.

When the outer Halbach-type magnet 2 is rotated while the inner Halbach-type magnet 1 is stationed, the relative direction between the magnetic field of the inner Halbach-type magnet 1 and the magnetic field of the outer Halbach-type magnet 2 is varied in accordance with the rotation of the outer Halbach-type magnet 2. Therefore, the intensity of the magnetic field to be applied to the magnetic refrigerating unit 3 is varied within a range of zero to a given several magnitudes (Tesla).

When the direction of the magnetic field 6 generated by the inner Halbach-type magnet 1 via the bore space thereof becomes parallel to the direction of the magnetic field 7 generated by the outer Halbach-type magnet 2 via the bore space thereof so as to generate, in the bore space, a magnetic field with high intensity to be applied to the magnetic refrigerating unit 3, the temperature of the magnetic material "A" is increased and the temperature of the magnetic material "B" is decreased. In this case, since the material "a" exhibits higher heat conductivity and the material "b" exhibits lower heat conductivity, in the magnetic refrigerating unit 3, the heat is flowed from the magnetic material "A" to the magnetic material "B" via the material "a" (denoted by the arrow 8 in FIG. 9(*a*)). When the direction of the magnetic field 6 generated by the inner Halbach-type magnet 1 via the bore space thereof becomes antiparallel to the direction of the magnetic field 7 generated by the outer Halbach-type magnet 2 via the bore space thereof so as to generate, in the bore space, a magnetic field with low intensity to be applied to the magnetic refrigerating unit 3, the temperature of the magnetic material "A" is decreased and the temperature of the magnetic material "B" is increased. In this case, since the material "a" exhibits lower heat conductivity and the material "b" exhibits higher heat conductivity, in the magnetic refrigerating unit 3, the heat is flowed from the magnetic material "B" to the magnetic material "A" via the material "b" (denoted by the arrow 8 in FIG. 9(*b*)).

In this way, when the magnetic refrigerating unit 3 is magnetized and demagnetized through the rotation of the outer Halbach-type magnet 2, the thus generated heat is transferred in one direction. With the magnetic refrigerating unit 3 of the stacking structure of "AaBb", the thus generated heat is transferred from the bottom surface to the top surface as shown in FIG. 9. In this case, when a substance to be refrigerated of a device different from the magnetic refrigerating device is connected with the bottom surface via a heat conductive member and a heat exhaust member is connected with the top surface via a heat conductive member, the intended magnetic refrigeration can be realized.

In this embodiment, since the magnetic refrigerating device is configured as a wet type device, the magnetic refrigerating device can be employed for absorbing the heat from the heat concentration area of an electronic device. In this embodiment, since only one driving means is provided and the driving means utilizes the rotation, the magnetic refrigerating device can be easily operated by means of a motor so as to be easily constructed and designed.

FIG. 10 is a structural view schematically illustrating the magnetic refrigerating device in FIG. 8 which contains a driving mechanism. FIG. 10(*a*) is directed at the schematic cross sectional view of the magnetic refrigerating device containing the driving mechanism, and FIG. 10(b) is directed at the top plan view of the magnetic refrigerating device containing the driving mechanism.

In FIG. 10, the reference numeral "1" designates an inner Halbach-type magnet, and the reference numeral "2" designates an outer Halbach-type magnet, and the reference numeral "3" designates a magnetic refrigerating (unit). The inner Halbach-type magnet 1 is fixed onto a plate (not shown) and the outer Halbach-type magnet 2 is also fixed onto a plate (not shown) via a movable mechanism (e.g., the bearing 14). A gear 11 is provided on the outer side of the outer Halbach-type magnet 2. A gear 13 is provided so as to be engaged with the gear 11, and connected with a rotating mechanism 12 (e.g., motor). The reference numeral "10" designates a substance to be refrigerated, and the reference numeral "15" designates a heat exhaust portion. The substance 10 and the heat exhaust portion 15 are connected with the magnetic refrigerating unit 3 via the heat conductive members 9 and 9'.

When the gear 13 is rotated by the rotating mechanism 12, the outer Halbach-type magnet 2 is rotated via the gear 11. As explained with reference to FIG. 9, when the outer Halbach-type magnet 2 is continuously rotated, the thus generated heat is transferred in the magnetic refrigerating unit 3 by the heat cycle operation of magnetic refrigeration so that heat is absorbed from the substance 10 to be refrigerated via the heat conductive member 9 (as designated by the arrow 8 in FIG. 10), and transferred to the heat exhaust portion 15 via the heat conductive member 9', thereby refrigerate the substance 10.

The heat conductive members 9 and 9' may be made of non-magnetic material with higher heat conductivity. Concretely, the heat conductive members 9 and 9' can be made of non-magnetic metal, ceramics or resin improved in heat conductivity. The heat exhaust portion 15 is made of material with higher heat conductivity and configured so as to be enlarged in specific surface. Preferably, the heat exhaust portion 15 is made of non-magnetic material in view of the influence of the magnetic field. Concretely, the heat exhaust portion 15 is made of Cu, Al or higher heat conductivity material containing Cu and/or Al. Then, the heat exhaust portion 15 is configured in plate-shape, fin-shape or honeycomb-shape so as to increase the specific surface thereof.

FIG. 11 is a structural view illustrating a further magnetic refrigerating device according to the present invention. FIG. 12 is an explanatory view for the heat transfer in the magnetic refrigerating device in FIG. 11. In this embodiment, a superconducting solenoid coil (superconducting magnet) is employed as a magnetic field-applying means for the magnetic refrigerating unit instead of the permanent magnet.

In this embodiment using the superconducting magnet as the magnetic field-applying means, a predetermined magnetic field is applied to the magnetic refrigerating unit 3 by disposing the magnetic refrigerating unit 3 in the bore space of the superconducting coil and is removed from the magnetic refrigerating unit 3 by drawing away the magnetic refrigerating unit 3 from the bore space of the superconducting coil. Concretely, the configuration as shown in FIG. 11(a) where the magnetic refrigerating unit 3 is disposed so that the direction 24 of the magnetic field generated from the superconducting coil is perpendicular to the stacking direction of the magnetic refrigerating unit 3 is not preferable because the magnetic refrigerating unit 3 largely suffers from the demagnetizing field. The configuration as shown in FIG. 11(b) where the magnetic refrigerating unit 3 is disposed so that the direction 24 of the magnetic field generated from the superconducting coil is almost parallel to the stacking direction of the magnetic refrigerating unit 3 is preferable because the magnetic refrigerating unit 3 does not almost suffer from the demagnetizing field.

FIG. 11(C) shows the magnetic refrigerating unit 3 in FIG. 11(b) three-dimensionally. In this embodiment, the magnetic refrigerating unit 3 has three units 3A, but may have four or more units 3A. Moreover, the magnetic refrigerating unit 3 has one two units 3A.

The heat transfer in the magnetic refrigerating device in this embodiment will be described with reference to FIG. 12. As shown in FIG. 12(a), when the magnetic refrigerating unit 3 is disposed in the bore space of the superconducting solenoid coil (superconducting magnet) 22, a predetermined magnetic field is applied to the magnetic refrigerating unit 3 so that the temperature of the magnetic material "A" is increased and the temperature of the magnetic material "B" is decreased. In this case, since the material "a" exhibits higher heat conductivity and the material "b" exhibits lower heat conductivity, in the magnetic refrigerating unit 3, the heat is flowed from the magnetic material "A" to the magnetic material "B" via the material "a" (denoted by the arrow 8 in FIG. 12(a)).

As shown in FIG. 12(b), when the magnetic refrigerating unit 3 is taken out of the bore space of the superconducting solenoid coil (superconducting magnet) 22, the predetermined magnetic field is removed from the magnetic refrigerating unit 3 so that the temperature of the magnetic material "A" is decreased and the temperature of the magnetic material "B" is increased. In this case, since the material "a" exhibits lower heat conductivity and the material "b" exhibits higher heat conductivity, in the magnetic refrigerating unit 3, the heat is flowed from the magnetic material "B" to the magnetic material "A" via the material "b" (denoted by the arrow 8 in FIG. 12(b)).

In this case, when the relative position between the magnetic refrigerating unit 3 and the superconducting magnet 22 is shifted, the magnetic refrigerating unit 3 is repeatedly magnetized and demagnetized so that the thus generated heat is flowed in one direction. In this embodiment using the magnetic refrigerating unit 3 containing the "AaBa" stacking unit 3A, the thus generated heat is transferred from the L side to the H side. If a substance to be refrigerated of a device different from the magnetic refrigerating device is connected with the L side via heat conductive member and a heat exhaust member is connected with the H side via a heat conductive member, the intended magnetic refrigeration can be realized.

Figure 14:
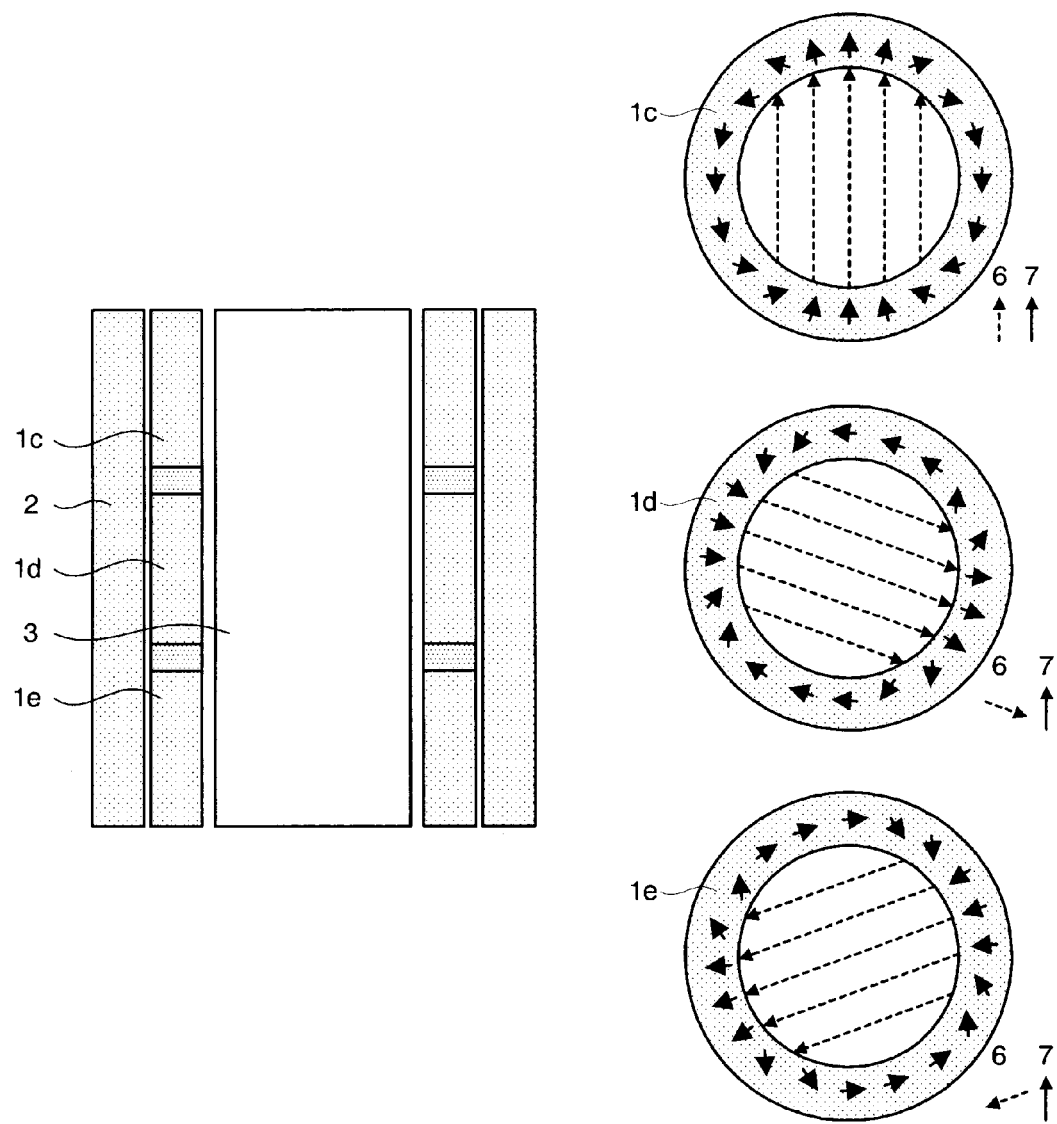
FIG. 14 is a structural view illustrating another magnetic refrigerating device according to the present invention.

FIG. 13 is a structural view illustrating another magnetic refrigerating device according to the present invention. FIG. 14 is a structural view illustrating still another magnetic refrigerating device according to the present invention. FIG. 15 is a structural view illustrating a further magnetic refrigerating device according to the present invention. In the above-described embodiments, a predetermined magnetic field is repeatedly applied to and removed from the magnetic refrigerating unit 3 by shifting the relative position between the magnetic refrigerating unit 3 and the magnet (permanent magnet or superconducting magnet). On the other hand, the magnetic materials "A" and "B" composing the magnetic refrigerating unit exhibit ferromagnetism or antiferromagnetism and thus, has the respective large magnetic moments. When the magnetic materials "A" and "B" are disposed in and removed from the magnetic space formed by the magnet, the large magnetic attractive force and repulsive force are generated between the magnetic materials and the magnet. As a result, a huge external force is required to change the relative position between the magnetic materials and the magnet against the large magnetic attractive force and the repulsive force.

In order to mitigate such a problem as described above, a plurality sets of magnetic refrigerating units and magnets are prepared so that the magnetic torque generated from one set of magnetic refrigerating unit and magnet can be cancelled by the magnetic torque generated from another set of magnetic refrigerating unit and magnet through the phase shift of the heat cycle. In this case, the motive energy load for realizing the heat cycle of magnetic refrigeration using the above-described magnetic refrigerating system can be reduced.

In the embodiments relating to FIGS. 13 and 14, the outer Halbach-type magnet 2 generates a magnetic field in one direction via the bore space. On the other hand, the inner Halbach-type magnet 1 is composed of a plurality of Halbach-type magnets 1a-1e via the fixing member 25 so that the magnetic fields can be generated from the Halbach-type magnets 1a-1e in various directions in accordance with the Halbach-type magnets 1a-1e. Namely, the direction 7 of the magnetic field generated from the outer Halbach-type magnet 2 is relatively different from the direction 6 of the magnetic field generated from the inner Halbach-type magnet 1. In the cyclic operation to change the magnetic field to be applied to the magnetic refrigerating unit 3 by rotating the outer Halbach-type magnet 2, the relative directions in magnetic field of the sets of inner Halbach-type magnets and the outer Halbach-type magnet are different from one another (e.g., "1a" and "2"; "1b" and "2" in FIG. 13, "1c" and "2"; "1d" and "2"; "1e" and "2" in FIG. 14).

In the embodiment relating to FIG. 15, the inner Halbach-type magnet 1 generates a magnetic field in one direction via the bore space. On the other hand, the outer Halbach-type magnet 2 is composed of a plurality of Halbach-type magnets 2a-2c via the fixing member 25. In this embodiment, too, the relative directions in magnetic field of the sets of inner Halbach-type magnet and the outer Halbach-type magnets are different from one another (e.g., "1" and "2a"; "1" and "2b"; "1 and "2c" in FIG. 15).

In this way, in the embodiments relating to FIGS. 13 through 15, the inner Halbach-type magnet or the outer Halbach-type magnet is composed of a plurality Halbach-type magnets so that the direction of the magnetic field generated from the inner Halbach-type magnet is different from the direction of the magnetic field generated from the outer Halbach-type magnet by shifting the plurality of the Halbach-type magnets. As a result, in the illustrated double-structured Halbach-type magnet, if the outer Halbach-type magnet is rotated under the condition that the inner Halbach-type magnet and the magnetic refrigerating unit are fixed, the thus generated magnetic torque can be cancelled only by the rotation of the outer Halbach-type magnet and thus, the motive energy load to rotate the outer Halbach-type magnet can be reduced.

Figure 16:
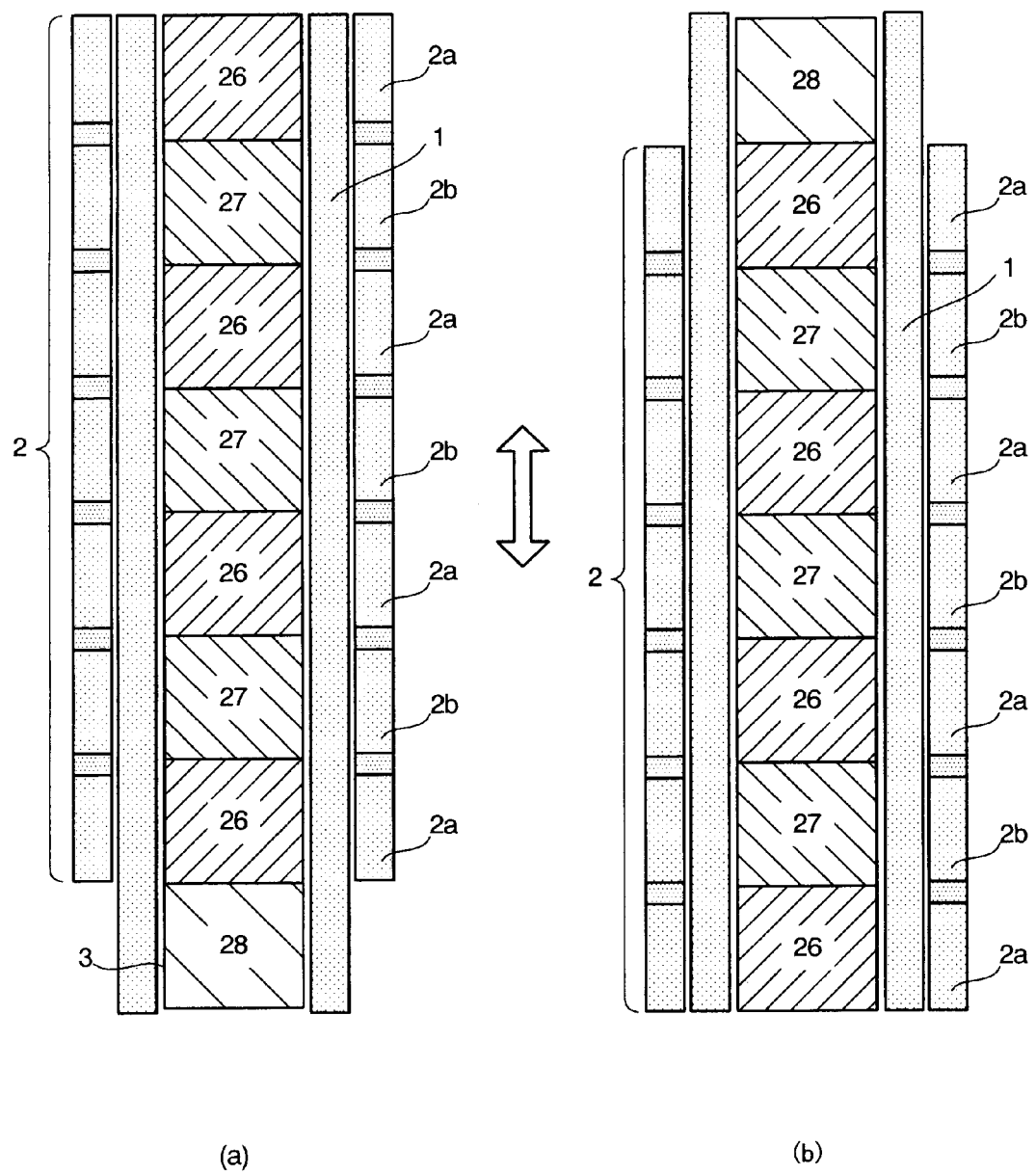
FIG. 16 is a structural view illustrating a further magnetic refrigerating device modified from the one in the embodiment relating to FIGS. 13-15.

FIG. 16 is a structural view illustrating a still further magnetic refrigerating device modified from the one in the embodiment relating to FIGS. 13 to 15. In this embodiment, the outer Halbach-type magnet 2 is composed of Halbach-type magnets 2a and 2b. In this case, since the direction of the magnetic field generated from the inner Halbach-type magnet 1 becomes parallel to the direction of the magnetic field generated from the outer Halbach-type magnet 2a, a magnetic field with higher intensity is generated in the space 26. On the other hand, since the direction of the magnetic field generated from the inner Halbach-type magnet 1 becomes antiparallel to the direction of the magnetic field generated from the outer Halbach-type magnet 2b so that the magnetic field from the inner Halbach-type magnet 1 is cancelled by the magnetic field from the outer Halbach-type magnet 2b, a magnetic field with lower intensity is generated in the space 27.

In this embodiment, the magnetic refrigerating unit 3 is disposed in the space 26 with higher magnetic intensity and the space 27 with lower magnetic intensity so that the intensity of the magnetic field to be applied to the magnetic refrigerating unit 3 becomes partially different depending on the position of the magnetic refrigerating unit 3. In this case, when the outer Halbach-type magnet 2 is shifted along the center axis thereof from the state denoted in FIG. 16(a) to the state denoted in FIG. 16(b), the intensity of the magnetic field to be applied to each position of the magnetic refrigerating unit 3 can be varied from the lower intensity to the higher intensity or vice versa. Therefore, if the outer Halbach-type magnet 2 is repeatedly shifted along the center axis, the application and the removal of the magnetic field for the magnetic refrigerating unit 3 can be repeatedly carried out.

In this embodiment, since the magnetic refrigerating unit 3 is always disposed in the magnetic field generated from the Halbach-type magnet, the resultant magnetic torque can be reduced so that the motive energy load for realizing the heat cycle of magnetic refrigeration through the change in intensity of the magnetic field can be reduced.

Particularly not shown, since the magnitude of the magnetic torque generated between the magnets is in proportion to the variation of the magnetic flux generated from the magnets and the magnitudes of the magnetic moments of the magnets, it is also effective to prevent the variation of the magnetic flux in order to reduce the motive energy load. Practically, in FIG. 6, since the magnetic refrigerating unit 3 is continuously scanned by the magnet 17, at least a portion of the magnetic refrigerating unit 3 is always located in the gap of the magnet so that the variation of the magnetic flux to the magnetic refrigerating unit 3 can be suppressed remarkably.

In FIG. 6, since the L side of the heat conductive member 9 is physically separated from the H side of the heat conductive member 9, the variation of the magnetic flux may becomes conspicuous around the separation. In this point of view, it is effective to provide a magnetic material 29 thermally independent from the magnetic refrigerating unit (not contributing the magnetic refrigeration).

The magnetic material "A" is required to exhibit the magneto-caloric effect that the temperature of the material "A" is increased by the application of the magnetic field and the temperature of the material "A" is decreased by the removal of the magnetic field. Preferably, therefore, the magnetic material "A" is a magnetic material exhibiting the magnetic phase transition (ordering) from paramagnetism to ferromagnetism or ferrimagnetism utilizing the inherent magnetic phase transition temperature. Concretely, the magnetic material "A" can be made of rare-earth metal, rare-earth metal alloy or intermetallic compound of rare-earth metal and transition metal such as Gd, Gd alloy, $R_2Fe_{17}$, $RCo_2$, $RNi_2$, $RAl_2$. The "R" means a rare-earth element.

The magnetic material "B" is required to exhibit the magneto-caloric effect that the temperature of the material "B" is decreased by the application of the magnetic field and the temperature of the material "B" is increased by the removal of the magnetic field. Preferably, therefore, the magnetic material "B" is a magnetic material exhibiting the magnetic phase transition (ordering) from antiferromagnetism to ferromagnetism. Concretely, the magnetic material "B" can be made of GdRh or $MnGa_3C$.

The heat conductive material "a" is required to exhibit higher heat conductivity under the application of the magnetic field and lower heat conductivity under the removal of the magnetic field. In this point of view, the heat conductive material "a" can be made of a material exhibiting the phase transition to the ferromagnetic and metallic phase from the non-magnetic and insulating phase.

The heat conductive material "b" is required to exhibit lower heat conductivity under the application of the magnetic field and higher heat conductivity under the removal of the magnetic field. In this point of view, the heat conductive material "b" can be made of a material exhibiting the large electron scattering from the ordering destruction by the application of the magnetic field contributing the reduction in heat conductivity or exhibiting the change of the lattice structure by the application of the magnetic field contributing the reduction in heat conductivity from the generated phonons.

Although the present invention was described in detail with reference to the above examples, this invention is not limited to the above disclosure and every kind of variation and modification may be made without departing from the scope of the present invention.

For example, although the magnetic refrigerants "A", "a", "B", "b" are subsequently stacked and unified to form the multilayered structure denoted by "AaBb", the magnetic refrigerants "A", "b", "B", "a" are subsequently stacked and unified to form the multilayered structure denoted by "AbBa". In the latter case, the heat transfer can be carried out by the application and the removal of the magnetic field. However, the magnetic material "A" is increased in temperature and the magnetic material "B" is decreased in temperature under the application of the magnetic field. Since the material "a" exhibits high heat conductivity and the material "b" exhibits low heat conductivity, the magnetic materials "A" and "B" are thermally insulated by the material "b" in the magnetic refrigerating unit 3 so that no heat is flowed.

On the other hand, the magnetic material "A" is decreased in temperature and the magnetic material "B" is increased in temperature under the removal of the magnetic field, e.g., when the magnetic refrigerating unit 3 is taken out of the gap of the U-shaped permanent magnet 18. Since the material "a" exhibits low heat conductivity and the material "b" exhibits high heat conductivity, the thus generated heat is flowed from the magnetic material "B" to the magnetic material "A".

As a result, when the magnetic refrigerating unit 3 is constituted of the multilayered structure of "AbBa", the heat transfer is carried out in the direction opposite to the direction designated by the arrow 8.

What is claimed is:

1. A magnetic refrigerating device, comprising:
    a magnetic refrigerating unit including a magnetic material "A" exhibiting a magneto-caloric effect that the temperature of said material "A" is increased by the application of a magnetic field and the temperature of said material "A" is decreased by the removal of a magnetic field, a magnetic material "B" exhibiting a magneto-caloric effect that the temperature of said material "B" is decreased by the application of a magnetic field and the temperature of said material "B" is increased by the removal of a magnetic field, a heat conductive material "a" exhibiting higher heat conductivity under the application of a magnetic field and lower heat conductivity under the removal of a magnetic field, and a heat conductive material "b" exhibiting lower heat conductivity under the application of a magnetic field and higher heat conductivity under the removal of a magnetic field, wherein said magnetic refrigerating unit is configured so as to include at least one layered structure denoted by "AaBb" which is formed by subsequently stacking said materials "A", "a", "B", "b" or at least one layered structure denoted by "AbBa" which is formed by subsequently stacking said materials "A", "b", "B", "a"; and
    a magnetic field-applying means to apply a magnetic field to said magnetic refrigerating unit.

2. The magnetic refrigerating device as set forth in claim 1, wherein said magnetic field-applying means is a superconducting magnet.

3. The magnetic refrigerating device as set forth in claim 1, wherein said magnetic field-applying means is a permanent magnet.

4. The magnetic refrigerating device as set forth in claim 3, wherein said permanent magnet is a Halbach-type magnet.

5. The magnetic refrigerating device as set forth in claim 4, wherein said permanent magnet is a double-structured Halbach-type magnet composed of an inner Halbach-type magnet and an outer Halbach-type magnet,
    wherein said magnetic refrigerating unit is disposed in a bore space of said inner Halbach-type magnet.

6. The magnetic refrigerating device as set forth in claim 5, wherein at least one of said inner Halbach-type magnet and said outer Halbach-type magnet is composed of a plurality of Halbach-type magnets which are configured such that the direction of a magnetic field generated from said inner Halbach-type magnet is different from the direction of a magnetic field generated from said outer Halbach-type magnet and a motive energy load for shifting the relative position between said inner Halbach-type magnet and said outer Halbach-type magnet is reduced.

7. The magnetic refrigerating device as set forth in claim 6, wherein said plurality of Halbach-type magnets are stacked along a flow direction of heat generated.

8. The magnetic refrigerating device as set forth in claim 5, further comprising a rotating mechanism to shift the relative position between said inner Halbach-type magnet and said outer Halbach-type magnet through the rotation of at least one of said inner Halbach-type magnet and said outer Halbach-type magnet.

9. The magnetic refrigerating device as set forth in claim 5, wherein said rotating mechanism is configured such that said outer Halbach-type magnet is rotated while the relative position between said inner Halbach-type magnet and said magnetic refrigerating unit disposed in said bore space of said inner Halbach-type magnet is fixed.

10. The magnetic refrigerating device as set forth in claim 1, further comprising a driving mechanism to shift the relative position between said magnetic refrigerating unit and said magnetic field-applying means.

11. The magnetic refrigerating device as set forth in claim 1, wherein said material "a" or "b" include a substance which is shifted from a metallic state phase to an insulating state phase by changing an intensity of a magnetic field to be applied thereto.

12. The magnetic refrigerating device as set forth in claim 1, wherein said material "a" or "b" include a substance which is shifted from a ferromagnetic metallic state phase to a non-magnetic insulating state phase by changing an intensity of a magnetic field to be applied thereto.

13. A magnetic refrigerating method, comprising:
    applying a first magnetic field with a first intensity to a magnetic refrigerating unit including a magnetic material "A" exhibiting a magneto-caloric effect that the temperature of said material "A" is increased by the application of a magnetic field and the temperature of said material "A" is decreased by the removal of a magnetic field, a magnetic material "B" exhibiting a magneto-caloric effect that the temperature of said material "B" is decreased by the application of a magnetic field and the temperature of said material "B" is increased by the removal of a magnetic field, a heat conductive material "a" exhibiting higher heat conductivity under the application of a magnetic field and lower heat conductivity under the removal of a magnetic field, and a heat conductive material "b" exhibiting lower heat conductivity under the application of a magnetic field and higher heat conductivity under the removal of a magnetic field, wherein said magnetic refrigerating unit is configured so as to include at least one layered structure denoted by "AaBb" which is formed by subsequently stacking said materials "A", "a", "B", "b" or at least one layered structure denoted by "AbBa" which is formed by subsequently stacking said materials "A", "b", "B", "a"; and applying a second magnetic field with a second intensity smaller than said first intensity to said magnetic refrigerating unit, wherein the thus generated heat is transferred from one end to the other end of said magnetic refrigerating unit.

14. The magnetic refrigerating method as set forth in claim 13, wherein said first magnetic field and said second magnetic field are generated from a superconducting magnet.

15. The magnetic refrigerating method as set forth in claim 13, wherein said first magnetic field and said second magnetic field are generated from a permanent magnet.

16. The magnetic refrigerating method as set forth in claim 15, wherein said permanent magnet is a Halbach-type magnet.

17. The magnetic refrigerating method as set forth in claim 16,
wherein said permanent magnet is a double-structured Halbach-type magnet composed of an inner Halbach-type magnet and an outer Halbach-type magnet,
wherein said magnetic refrigerating unit is disposed in a bore space of said inner Halbach-type magnet.

18. The magnetic refrigerating method as set forth in claim 17, wherein at least one of said inner Halbach-type magnet and said outer Halbach-type magnet is composed of a plurality of Halbach-type magnets which are configured such that the direction of a magnetic field generated from said inner Halbach-type magnet is different from the direction of a magnetic field generated from said outer Halbach-type magnet and a motive energy load for shifting the relative position between said inner Halbach-type magnet and said outer Halbach-type magnet is reduced.

19. The magnetic refrigerating method as set forth in claim 18, wherein said plurality of Halbach-type magnets are stacked along a flow direction of heat generated.

20. The magnetic refrigerating method as set forth in claim 13, wherein said first magnetic field and said second magnetic field are generated by shifting a relative position between said magnetic refrigerating unit and a magnetic applying means.

* * * * *